(12) United States Patent
Easley

(10) Patent No.: US 10,363,624 B2
(45) Date of Patent: Jul. 30, 2019

(54) ACTIVE METAL BRAZE JOINT WITH STRESS RELIEVING LAYER

(71) Applicant: DIAMOND INNOVATIONS, INC., Worthington, OH (US)

(72) Inventor: Thomas Easley, Bexley, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 0 days.

(21) Appl. No.: 15/301,115

(22) PCT Filed: Apr. 3, 2015

(86) PCT No.: PCT/US2015/024281
§ 371 (c)(1),
(2) Date: Sep. 30, 2016

(87) PCT Pub. No.: WO2015/157113
PCT Pub. Date: Oct. 15, 2015

(65) Prior Publication Data
US 2017/0014930 A1 Jan. 19, 2017

Related U.S. Application Data

(60) Provisional application No. 61/975,906, filed on Apr. 6, 2014.

(51) Int. Cl.
*B32B 15/00* (2006.01)
*B23K 1/19* (2006.01)
(Continued)

(52) U.S. Cl.
CPC ............ *B23K 1/19* (2013.01); *B23K 1/0008* (2013.01); *B23K 31/025* (2013.01); *B24D 99/005* (2013.01); *C04B 37/003* (2013.01); *C04B 37/006* (2013.01); *C04B 37/023* (2013.01); *E21B 10/5735* (2013.01); *E21C 35/183* (2013.01); *B23K 2101/20* (2018.08); *B23K 2103/12* (2018.08); *B23K 2103/172* (2018.08); *B23K 2103/18* (2018.08); *B23K 2103/26* (2018.08); *B23K 2103/50* (2018.08);
(Continued)

(58) Field of Classification Search
None
See application file for complete search history.

(56) References Cited

U.S. PATENT DOCUMENTS 4,919,220 A * 4/1990 Fuller ............... E21B 10/567
175/433
5,049,164 A 9/1991 Horton et al.
(Continued)

FOREIGN PATENT DOCUMENTS

EP 236086 B1 5/1990
EP 238938 B1 7/1990
(Continued)

*Primary Examiner* — Seth Dumbris

(57) ABSTRACT

The present disclosure relates to a brazed superabrasive assemblies and method of producing brazed superabrasive assemblies. The brazed superabrasive assemblies may include a plurality of braze alloy layers that are positioned opposite a stress relieving layer. The stress relieving layer may have a solidus temperature that is greater than a solidus temperature of the plurality of braze alloy layers.

9 Claims, 3 Drawing Sheets

(51) Int. Cl.
    *B23K 1/00*            (2006.01)
    *B23K 31/02*          (2006.01)
    *E21B 10/573*        (2006.01)
    *B24D 99/00*          (2010.01)
    *C04B 37/00*          (2006.01)
    *C04B 37/02*          (2006.01)
    *E21C 35/183*        (2006.01)
    *B23K 103/12*        (2006.01)
    *B23K 103/18*        (2006.01)
    *B23K 103/00*        (2006.01)
    *E21C 35/18*          (2006.01)
    *B23K 101/20*        (2006.01)
    *B23K 103/16*        (2006.01)

(52) U.S. Cl.
    CPC .... *B23K 2103/52* (2018.08); *C04B 2237/122* (2013.01); *C04B 2237/123* (2013.01); *C04B 2237/124* (2013.01); *C04B 2237/125* (2013.01); *C04B 2237/126* (2013.01); *C04B 2237/16* (2013.01); *C04B 2237/32* (2013.01); *C04B 2237/36* (2013.01); *C04B 2237/361* (2013.01); *C04B 2237/363* (2013.01); *C04B 2237/365* (2013.01); *C04B 2237/567* (2013.01); *C04B 2237/60* (2013.01); *C04B 2237/72* (2013.01); *E21C 2035/1803* (2013.01)

(56) References Cited

U.S. PATENT DOCUMENTS

| | | |
|---|---|---|
| 5,306,565 A | 4/1994 | Corbin et al. |
| 6,068,072 A | 5/2000 | Besson et al. |
| 6,102,024 A | 8/2000 | Buljan et al. |
| 6,196,340 B1 | 3/2001 | Jensen et al. |
| 6,575,353 B2 | 6/2003 | Palmgren |
| 6,733,087 B2 | 5/2004 | Hall |
| 7,267,187 B2 | 9/2007 | Kembaiyan |
| 7,487,849 B2 | 2/2009 | Radtke |
| 7,963,616 B2 | 6/2011 | Weaver et al. |
| 8,061,454 B2 | 11/2011 | Voronin et al. |
| 2003/0209366 A1 | 11/2003 | McAlvain |
| 2004/0026983 A1 | 2/2004 | McAlvain |
| 2004/0065484 A1 | 4/2004 | Wang |
| 2006/0254830 A1 | 11/2006 | Radtke |
| 2008/0272181 A1 | 11/2008 | Wang |
| 2009/0173547 A1 | 7/2009 | Voronin et al. |
| 2010/0203341 A1 | 8/2010 | Egan |
| 2010/0206941 A1 | 8/2010 | Egan |
| 2010/0300767 A1 | 12/2010 | Cariveau et al. |
| 2013/0022836 A1 | 1/2013 | Easley et al. |
| 2014/0020823 A1* | 1/2014 | Montross ............... B23K 31/02 228/121 |

FOREIGN PATENT DOCUMENTS

| | | |
|---|---|---|
| EP | 184455 B1 | 11/1990 |
| EP | 166379 B1 | 1/1991 |
| EP | 2525930 A2 | 11/2012 |
| GB | 2491685 A | 12/2012 |
| WO | 1995016530 A1 | 6/1995 |
| WO | 2012152661 A1 | 11/2012 |

\* cited by examiner

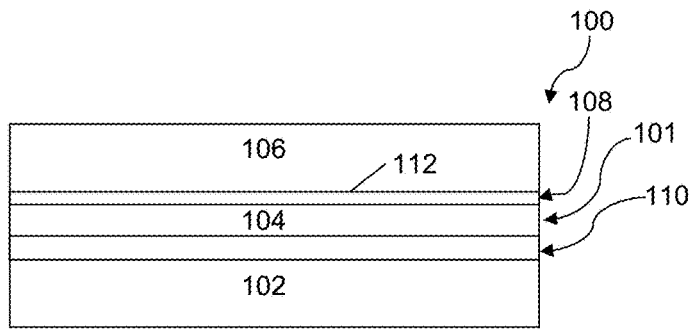

FIG. 1

```
sandwiching a plurality of braze alloy layers between a first diamond containing
material and a substrate, wherein at least a portion of a surface of the first diamond-
containing material is in direct contact with a first layer of the plurality of braze alloy
layers, at least a portion of a surface of the substrate is in direct contact with a last
layer of the plurality of braze alloy layers, wherein the first layer and the last layer are
at opposite side of the plurality of the braze alloy layers;
                                    │
                                    ▼
applying a heat source to heat at least one of the plurality of braze alloy layers, the first
diamond containing material and the substrate at a predetermined temperature until the
first layer and the last layer of the plurality of the braze alloy layers begin to melt; and
                                    │
                                    ▼
forming a refractory metal carbide between the first diamond-containing material and a
second layer of the plurality of braze alloy layers.
```

FIG. 2

ACTIVE METAL BRAZE JOINT WITH STRESS RELIEVING LAYER

TECHNICAL FIELD AND INDUSTRIAL APPLICABILITY

The present invention relates generally to a superabrasive compact and its method of making, and more particularly, to a mining pick and method of brazing a mining pick to cemented tungsten carbide body.

Diamond-containing materials may be used for machining, cutting, grinding, polishing, and/or drilling metals, metal alloys, composites, glass, plastics, wood, rocks, geological formations, subterranean formations and ceramics. Diamond-containing materials may be bonded to substrates for the purpose of improving the performance of a tool by bonding a diamond-containing material to a substrate. In this way, the diamond-containing material may provide a hard, abrasive surface while the substrate may provide strength, toughness, and a means of attaching the tool to a tool holder. The substrate may provide strength and ease manipulation when the substrate is part of a tool, which integrates the diamond-containing material.

Many diamond-containing materials are formed as polycrystalline layers integrally bonded to a tungsten carbide substrate. In order to incorporate these materials into tools, they are cut to the desired size and shape and the substrate is brazed to a tool holder. The methods for this type of tool manufacturing are well known to those practiced in the art.

Other diamond-containing materials are formed as free standing bodies or layers. One of the problems of using these types of diamond-containing materials in a tool is that the diamond-containing material must be adequately bonded to the substrate to allow the tool to function effectively. For example, the bonding of a diamond-containing material to a substrate is typically carried out using a braze metal or alloy at a temperature of about 700° C. to about 1200° C. However, thermal oxidization of many diamond-containing materials takes place above temperatures of about 700° C. The thermally oxidized surface of the diamond-containing material interferes with the ability to braze the diamond-containing material to the substrate and/or deteriorates the integrity of the diamond-containing material.

SUMMARY

The following embodiments are not an extensive overview. The following description is not intended to identify critical elements of the various embodiments, nor is it intended to limit the scope of them.

In one embodiment, a brazed superabrasive assembly includes a superabrasive layer, a stress relieving layer coupled to the superabrasive layer by a first braze layer, and a substrate coupled to the stress relieving layer by a last braze layer. The stress relieving layer has a solidus or melting temperature that is greater than a solidus temperature of the first braze layer and the last braze layer.

In another embodiment, A method of fabricating a brazed superabrasive assembly includes positioning a plurality of braze alloy layers between a first diamond containing material and a substrate. At least a portion of a surface of the first diamond-containing material is in direct contact with a first layer of braze alloy. At least a portion of a surface of the substrate is in direct contact with a last layer of braze alloy, and the first layer and the last layer are positioned along opposite sides of a stress relieving layer. The method further includes applying a heat source to heat the plurality of layers of braze alloy, the first diamond containing material, and the substrate to a predetermined temperature until the first layer and the last layer of braze alloy reach at least their liquidus temperatures. The method also includes forming a refractory metal carbide between the first diamond-containing material and the stress relieving layer.

It is understood that both the foregoing general description and the following detailed description are exemplary and are intended to provide further explanation of the disclosed materials, products, and methods of production.

BRIEF DESCRIPTION OF THE DRAWINGS

For the purpose of illustrating the embodiments enclosed herein, there are depicted in the drawings certain embodiments of a diamond-containing material and a brazed diamond-containing material. However, the methods and related products are not limited to the precise arraignments and instrumentalities of the embodiments depicted in the drawings.

FIG. 1 schematically depicts a brazed superabrasive joint comprising a first diamond-containing material according to an embodiment;

FIG. 2 schematically depicts a flow diagram illustrating a method of making a brazed superabrasive joint containing diamond-containing material, wherein a diamond-containing material is brazed to a substrate according to an embodiment;

DETAILED DESCRIPTION

Figure 3:
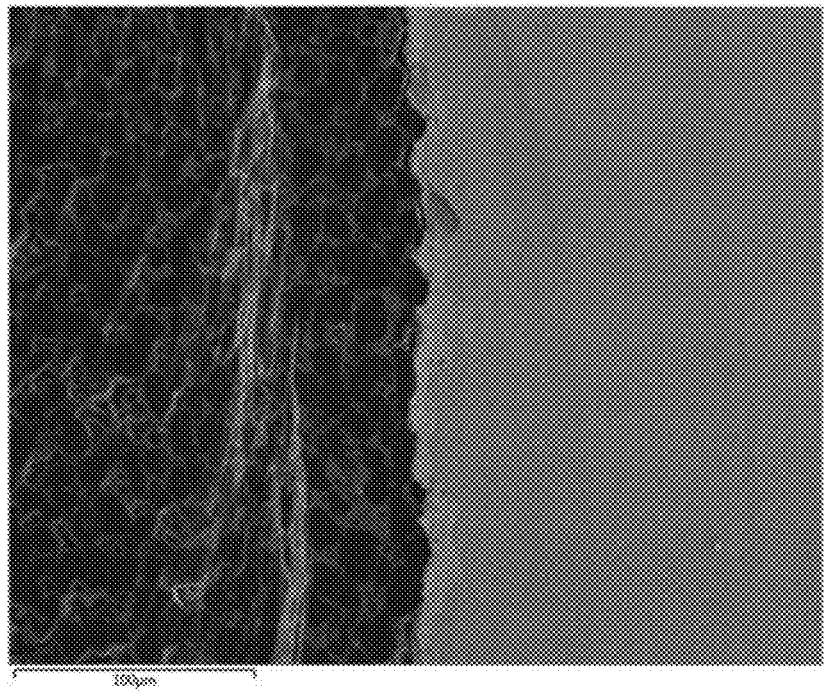
FIG. 3 is a cross-sectional view of a brazed superabrasive joint containing a diamond-containing material, a Ticusil® layer, and a stress-relieving layer according an embodiment.

Before the description of the embodiment, terminology, methodology, systems, and materials are described; it is to be understood that this disclosure is not limited to the particular terminologies, methodologies, systems, and materials described, as these may vary. It is also to be understood that the terminology used in the description is for the purpose of describing the particular versions of embodiments only, and is not intended to limit the scope of embodiments. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

The articles "a" and "an" are used herein to refer to one or more than one object of the article. By way of example, "an element" means one or more than one element. The term "about" will be understood by persons of ordinary skill in the art to depend on the context in which it is used.

As used herein, the term "about" means plus or minus 10% of the numerical value of the number with which it is being used. Therefore, about 40% means in the range of 36% to 44%.

It is understood that any or all whole or partial integers between any ranges set forth herein are included.

The term "brazed" refers to an object which has been joined by a brazing process.

The term "brazing" means a metal-joining process whereby a braze metal or alloy is melted by heating the braze metal or alloy above the liquidus temperature of the braze metal or alloy and bringing the melted brazed metal into contact with at least two objects such that, when the temperature goes below liquidus temperature of the braze metal or alloy, the two objects are joined (bound) by at least the braze metal or alloy to each other. For example, a braze metal or alloy may be melted and the liquid braze metal or alloy may be brought into contact with a diamond-containing material and a substrate material to fasten the diamond-containing material to the substrate.

The term "refractory metal" refers to an element having a melting point at or above about 1850° C. Examples of a refractory metal may include niobium, molybdenum, tantalum, tungsten, rhenium, titanium, vanadium, chromium, zirconium, hafnium, ruthenium, osmium, and iridium.

The term "refractory metal carbide" refers to carbide formed from at least one refractory metal.

The term "braze metal" or "braze metal alloy" refers to a metal or metal alloy having a melting point from about 500° C. to about 1849° C.

The term "cemented carbide" refers to a composite material formed from metal carbide crystals bonded together by a metallic matrix. For example, tungsten carbide crystals may be bonded together by a cobalt metal matrix.

The term "tungsten carbide" refers to the cemented carbide formed from tungsten carbide crystals bonded together by a cobalt metal matrix.

The term "polycrystalline diamond" refers to a material formed of diamond crystals which are sintered together to form a solid article. For example, one well known process involves the use of cobalt metal as a liquid phase sintering agent, and the resulting composite material contains a continuous matrix of sintered diamond crystals with interstitial cobalt.

The term "PCD" is an abbreviation for polycrystalline diamond.

The term "thermally stable diamond composite" refers to a PCD material which has had most or all of the cobalt removed from it, for example, by dissolving the cobalt in strong acids.

The term "continuous" refers to the form of a layer, wherein all of the material of the layer is interconnected; however, a continuous layer may contain holes or gaps in the layer as long as all of the material of the layer forms a single whole.

The term "discontinuous" refers to the form of a layer, wherein at least a portion of the material of the layer is not interconnected, such that one portion does not directly contact another portion. For example, a discontinuous layer may include multiple portions of the material of the layer, wherein the multiple portions are randomly distributed on a surface.

The term "alloy" refers to a mixture of more than one metal.

The term "non-refractory metal" means a metal having a melting point of less than 1850° C.

The term "liquidus temperature" means the temperature above which a metal or metal alloy is completely liquefied.

The term "solidus temperature" means the temperature below which a metal or metal alloy is completely solidified.

The term "ambient air pressure" refers to the atmospheric pressure to the environment of process in which the brazed diamond coated material is brazed and includes 760 mbar±20 mbar.

The term "in air" refers to the atmospheric gas mixture of the environment of process in which the brazed diamond coated material is brazed and includes 21% oxygen±5%.

Unless otherwise indicated, all measurements are in metric units.

The present disclosure is directed to brazed superabrasive assemblies in which a superabrasive layer is coupled to a substrate with a stress relieving layer positioned therebetween. Because superabrasive layers may exhibit a coefficient of thermal expansion that differs from the substrate, directly brazing the superabrasive layer to the substrate may induce undesirable stress to the braze layer, the superabrasive layer, and/or the substrate following assembly and during operation by an end user. By incorporating a stress relieving layer, which typically exhibits good ductility, the mismatch in thermal expansion between the superabrasive layer and the substrate, and the stress and strain resulting therefrom, can be directed into the stress relieving layer and away from the superabrasive layer, the substrate, and the braze layers. Incorporation of the stress relieving layer may, therefore, increase the performance of the braze joint as compared to a directly-brazed assembly.

Polycrystalline diamond composite (or "PDC", as used hereafter) may represent a volume of crystalline diamond grains with embedded foreign material filling the inter-grain space. In one particular case, polycrystalline diamond composite comprises crystalline diamond grains, bonded to each other by strong diamond-to-diamond bonds and forming a rigid polycrystalline diamond body, and the inter-grain regions, disposed between the bonded grains and filled with a catalyst material (e.g. cobalt or its alloys), which was used to promote diamond bonding during fabrication. Suitable metal solvent catalysts may include the metal in Group VIII of the Periodic table. PDC cutting element (or "PDC cutter", as is used hereafter) comprises an above mentioned polycrystalline diamond body attached to a suitable support substrate, e.g., cobalt cemented tungsten carbide (WC—Co), by the virtue of the presence of cobalt metal. In another particular case, polycrystalline diamond composite comprises a plurality of crystalline diamond grains, which are not bonded to each other, but instead are bound together by foreign bonding materials, such as borides, nitrides, and carbides, e.g. SiC.

Polycrystalline diamond composites and PDC cutters may be fabricated in different ways and PDC cutters may be coated via different methods. In one example, PDC cutters are formed by placing a mixture of diamond powder with a suitable solvent catalyst material (e.g. cobalt) on the top of WC—Co substrate, whose assembly is subjected to processing conditions of extremely high pressure and high temperature (HPHT), where the solvent catalyst promotes desired inter-crystalline diamond-to-diamond bonding and, also, provides a binding between polycrystalline diamond body and substrate support.

The presence of catalyst materials inside the polycrystalline diamond body promotes the degradation of the cutting edge of the compact during the cutting process, especially if the edge temperature reaches a high enough critical value. It is theorized that the cobalt driven degradation may be caused by the large difference in thermal expansion between diamond and catalyst (e.g. cobalt metal), and also by the catalytic effect of cobalt on diamond graphitization. Removal of catalyst from the polycrystalline diamond body of PDC compact, for example, by chemical leaching in acids, leaves an interconnected network of pores and a residual catalyst (up to about 10 vol %) trapped inside the polycrystalline diamond body. It has been demonstrated that depletion of cobalt from the polycrystalline diamond body of the PDC compact significantly improves a compact's abrasion resistance particularly when cutting conditions produce high temperatures at the cutting point. Thus, it is theorized that a thicker cobalt depleted layer near the cutting edge, such as more than about 100 µm provides better abrasion resistance of the PDC compact than a thinner cobalt depleted layer, such as less than about 100 µm.

In another example, PDC cutter is formed by placing diamond powder without a catalyst material on the top of substrate containing a catalyst material (e.g. WC—Co substrate or an additional thin cobalt disk in contact with the diamond powder). In this example, necessary cobalt catalyst material is supplied from the substrate and melted cobalt is swept through the diamond powder during the HPHT process.

In still another example, a hard polycrystalline diamond composite is fabricated by forming a mixture of diamond powder with silicon powder and the mixture is infiltrated by an external silicon source into the diamond and silicon powder bed in an HPHT process. Under HPHT conditions, the silicon melts and reacts with diamond grains to form SiC, thus forming a dense polycrystalline cutter where diamond particles are bound together by newly formed SiC material. Diamond composites made using this method are often called "silicon carbide bonded diamond composites." The silicon carbide bonded diamond composites and its method of making may be found in patent publication number US 2013/0022836.

Mining picks made from silicon carbide bonded diamond composites, such as Versimax® (produced by Diamond Innovations, Inc., Worthington, Ohio), have been lab tested and shown to have superior performance to cemented WC materials. In order to make tools, diamond inserts may be brazed into cemented WC holders. Mining picks may be centered in cemented WC holders to maintain an even braze joint around the entire brazed surface of the insert. Furnace brazing, induction brazing, or microwave brazing may be used in conjunction with active or non-active brazing alloys. In furnace brazing, the atmosphere may be vacuum, Ar, $H_2$, $N_2$ or combinations thereof. Mining picks may be coated by metals, metal carbides, or mixtures of metal and metal carbides, or uncoated, depending on the needs of the chosen brazing method and brazing alloy.

Referring to FIG. 1, in an embodiment, a brazed superabrasive joint 100 may comprise a plurality of braze alloy layers 101 having a stress relieving layer 104 wherein the stress relieving layer 104 comprises a non-melting layer.

In one embodiment, the stress relieving layer 104 comprises a copper layer. In another embodiment, the stress relieving layer 104 comprises a nickel layer. The stress relieving layer 104 may have a liquidus or melting temperature that is greater than the liquidus temperature of the braze alloy layers 101, such that when the brazed superabrasive joint 100 is subjected to a temperature sufficient to melt the braze alloy layers 101, the stress relieving layer 104 remains unmelted. The plurality of braze alloy layers 101 may have a first layer 108 and a last layer 110. The last layer 110 is opposite side of the first layer 108. The brazed superabrasive joint may further include a superabrasive layer 106 (here, a first diamond-containing material 106). At least a portion of a surface of the first diamond-containing material 106 may be in direct contact with the first layer of the plurality of braze alloy layers 101. The brazed superabrasive joint 100 may further include a substrate 102. At least a portion of a surface of the substrate 102 may be in direct contact with the last layer 110 of the plurality of braze alloy layers 101. The first layer 108 of the brazed superabrasive joint 100 may further comprise a carbide layer 112 which may comprise a refractory metal carbide, wherein the carbide layer may be in direct contact with the diamond-containing material 106. The carbide layer 112 may be continuous or discontinuous.

The carbide layer 112 may be positioned between the first diamond-containing material and a refractory metal layer, thereby "sandwiching" the carbide layer 112 between the first diamond-containing material and the refractory metal layer. In some embodiments, the refractory metal layer may be introduced during a brazing process when using active braze alloys (for example and without limitation, Ticusil, Incusil, or Palnicro, all available from Wesgo Metals) that contain the refractory metal. In these embodiments, the brazing process may bring the refractory metal that is present in the braze alloy layer 101 into intimate contact with the superabrasive layer 106. In other embodiments, a refractory metal layer may be applied directly to the superabrasive layer 106 prior to introduction of the braze alloy layer 101. The refractory metal layer may be applied to the superabrasive layer 106 by a variety of coating methods including, for example and without limitation, coating by physical vapor deposition, chemical vapor deposition, sputtering, evaporation, eletroless plating, electroplating, thermal diffusion or combinations or series thereof The carbide layer 112 may be formed in-situ from a reaction between the refractory metal layer and diamond in the superabrasive layer 106 at a brazing temperature. More specifically, the refractory metal layer, such as layers containing titanium or chromium, may dissolve carbon from diamonds in the superabrasive layer 106 to form the carbide layer, such as a TiC or a CrC layer. The refractory metal may be classified as a good carbide former. The plurality of braze alloy layers may have a thickness of about 25 µm to about 300 µm before melting.

The stress relieving layer 104 may be selected from materials that exhibit good ductility. Such materials may have high elongation prior to tensile failure. In some embodiments, the materials may have a relatively low modulus as compared to the materials of the superabrasive layer 106 and the substrate 102, and may have a lower modulus than the braze alloy layers 101. In one embodiment, the stress relieving layer 104 may be copper or a copper-containing alloy. In another embodiment, the stress relieving layer 104 may be nickel or a nickel-containing alloy.

The refractory metal layer may comprise a refractory metal or a refractory metal alloy. The refractory metal layer may be in direct contact with the carbide layer or the first diamond-containing material 106. The first layer 108 of the plurality of layers 101 of the brazed superabrasive joint 100 may further comprise a first braze metal layer which may comprise a braze metal, wherein the first braze metal layer may be in direct contact with at least a portion of the refractory metal layer. In one embodiment, the last layer 110 of the plurality of layers 101 may comprise only a second braze metal layer. In another embodiment, the last layer 110 of the plurality of braze alloy layers 101 may comprise a second braze metal layer and a refractory metal layer. In an embodiment, the first or second braze metal layer may comprise silver, copper, manganese, nickel, zinc, palladium, chromium, boron, titanium, tin, silicon, cadmium, gold, aluminum, indium or an alloy or composite thereof.

At least a portion of a surface of the substrate 102 may be in direct contact with the braze metal layer, and the substrate may comprise a second diamond-containing material, a cemented carbide, a polycrystalline cubic boron nitride (PcBN) superabrasive, a ceramic, a metal, a metal alloy, and/or combinations thereof. The primary function of the substrate 102 may be to provide this structural support for the superabrasive layer 106. The choice of substrate material is dependent upon the requirements of each application. Cemented tungsten carbide that is widely used as a substrate material may be often chosen for its high strength, toughness, hardness, and ability to be brazed to a steel tool holder.

Other substrates may be chosen depending on the requirements of the intended applications. Steel may be chosen for applications where the high hardness of cemented tungsten carbide is unnecessary. Ceramic substrates may be chosen when chemical inertness is needed. Two pieces of diamond composite materials may be attached to each other in order to form a diamond composite with a thickness greater than either single layer.

The choice for a diamond-containing material is not particularly limited, so long as the diamond-containing material is capable of reacting with a refractory metal layer to form a refractory metal carbide layer. The diamond-containing material may function as a superabrasive tool for such material removal applications as milling, turning, woodworking, dressing, drilling, mining, or the like. The diamond-containing material may function in wear resistant applications as nozzles, wear pads, wear surfaces, wear resistant cladding or liners, or the like. The method of attaching diamond may be useful for producing a wide variety of diamond-containing materials having other useful applications. The first diamond-containing material may comprise a single crystal diamond, a chemical vapor deposition (CVD) diamond, a silicon carbide bonded diamond composite, a cobalt-polycrystalline diamond composite, a thermally-stable diamond composite, and/or combinations thereof. Different types of diamond may be suitable for different end-user applications, depending on the properties required for each application. In general, diamond is used for its extreme hardness, chemical stability, and high thermal conductivity. Polycrystalline diamond, or PCD, is widely used as a tool for material removal applications such as milling, turning, woodworking, drilling and others. For many applications, PCD may be formed as a layer that is integrally bonded to a cemented tungsten carbide substrate during the high-pressure, high-temperature PCD manufacturing process.

While PCD possesses the desirable properties of high hardness and strength, PCD may have less desirable properties compared to other diamond-containing materials. Due to the presence of cobalt in the material, PCD may suffer from poor thermal stability and may be prone to cracking when exposed to temperatures above about 700° C. PCD also may suffer from poor corrosion resistance in some applications, in which the cobalt may be subject to chemical attack. Other diamond-containing materials, including CVD diamond, silicon carbide bonded diamond composites, and thermally stable diamond composites, possess better thermal stability and corrosion resistance than PCD.

In applications where the diamond may be exposed to high temperatures, CVD diamond, silicon carbide bonded diamond composites, and thermally stable diamond composites may be preferred to PCD. Furthermore, CVD diamond, silicon carbide bonded diamond composites, and thermally stable diamond composites are not normally attached to a substrate material. To incorporate CVD diamond, silicon carbide bonded diamond composites, and thermally stable diamond composites in tools and other articles, it is desired to have a cost effective method of attachment to a substrate material.

In an embodiment, the brazed superabrasive joint may comprise the refractory metal layer. The choice of a refractory metal or a refractory metal alloy may not be particularly limited so long as the refractory metal layer or alloy may react with a diamond-containing material, withstand a temperature of at least about 700° C., may be wet or coated by a melted braze metal, and may form a strong bond with the diamond-containing material. In an embodiment, the refractory metal or metal alloy may comprise tungsten, titanium, niobium, zirconium, chromium, or molybdenum and/or combinations thereof. The refractory metal may be used to bond to a braze metal and to a diamond-containing material, and prevent oxidation of an underlying diamond-containing material. Further, in an embodiment, the refractory metal layer may have a thickness of about 0.1 micrometer to about 100 micrometers, for example, including about 0.1 micrometers to 25 micrometers, including about 0.5 micrometers to 2.5 micrometers, including about 1 micrometer to 2 micrometers, for example.

In order to form a strong bond with the diamond-containing material, the refractory metal may also be good carbide former. The formation of a carbide at the interface between the refractory metal and the diamond results in a high strength bond between the two materials. For example, tungsten, titanium, or chromium may provide a combination of desirable properties, including high melting point, ability to form the tungsten carbide (WC), titanium carbide, or chromium carbide respectively, oxidation resistance, and compatibility with common brazing alloys.

In one embodiment, the diamond-containing material may be uncoated. In another embodiment, the diamond-containing material may be coated in order to get strong bonding with the brazing metal. The diamond materials may either be coated or brazed with standard braze alloys, or it may be uncoated and brazed with active braze alloys, which contain Ti or other refractory metals that react with diamond to provide a strong attachment. The refractory metal or metal alloy may be deposited directly onto the diamond-containing material by a coating method to form the refractory metal layer. The method of coating the refractory metal onto the diamond-containing material is not particularly limited so long as the refractory metal forms a strong bond with the diamond-containing material and forms a predominantly continuous refractory metal layer on the diamond-containing material such that at least part of the diamond-containing material is coated. The coating method for forming the refractory metal layer may comprise physical vapor deposition, chemical vapor deposition, sputtering, evaporation, eletroless plating, electroplating, thermal diffusion or combinations or series thereof.

Chemical vapor deposition may be a particularly well suited coating method. Using CVD, high purity coatings may be applied with a very uniform and well controlled thickness. CVD coatings may be produced with a very strong bond between the coating and diamond-containing material.

In an embodiment, the carbide layer may comprise refractory metal carbide or refractory metal alloy carbide. When formed, the carbide layer may form a continuous or discontinuous layer of material which binds the refractory metal layer to the diamond-containing material. The metal carbide or metal alloy carbide may be formed at the interface of the refractory metal layer and diamond-containing material; therefore, the refractory metal layer may comprise at least the elements of the refractory metal, refractory metal alloy, and/or diamond-containing material.

The carbide layer may be formed during any step. If formed, the carbide layer may function to improve the adherence of the diamond-containing material and refractory metal layers to each other. The carbide layer may form a continuous layer containing holes or discontinuous layer containing gaps between the material of the carbide layer, wherein the first diamond-containing material and the refractory metal layer may come into direct contact with one another. Because the metal carbide layer may be more brittle than the diamond-containing material or the refractory metal, the thickness of the metal carbide layer should be minimized. Only a very thin layer may be advantageous in improving the adherence of the diamond-containing material to the refractory metal layer. In some embodiments, the carbide layer may have a thickness of about 0.005 µm to about 5 µm, for example. The refractory metal carbide may be formed from the reaction between the metal atoms contained in the refractory metal and the carbon atoms contained in the diamond-containing material. As such the composition of the refractory metal carbide may be dependent upon the elemental composition of the refractory metal layer.

In an embodiment, the braze metal layer may comprise a braze metal or braze metal alloy. The choice for the braze metal or braze metal alloy may not be particularly limited so long as the braze metal or alloy is appropriate for brazing the refractory metal layer and the substrate. The braze metal may comprise silver, copper, manganese, nickel, zinc, platinum, chromium, boron, titanium, tin, silicon, cadmium, gold, palladium, aluminum, indium or an alloy or composite thereof.

Braze alloys containing about 40% to about 80% Ag, for example, may be practical compositions for joining a cemented tungsten carbide substrate to diamond-containing materials. One example may be a silver-copper eutectic brazing-filler material containing titanium. Silver-copper eutectic brazing-filler material containing titanium is called Ticusil®, and is commercially available from Wesgo Metals, Hayward, Calif. In on example, the braze alloy includes a thin titanium foil that is coated on either side with Cu—Ag eutectic layers, such that the braze alloy is in the form of a lamellar composition. When subjected to brazing temperatures, the Cu—Ag eutectic layers disperse and are generally separated from one another by the titanium inner foil. In general, diamonds brazed to a substrate by the silver-copper eutectic brazing-filler material have a higher attachment strength as compared with diamonds joined by adhesives to a substrate. In other embodiments, the braze alloy may include titanium, copper, and silver, which are inter-mixed together to form a eutectic composition having generally uniform properties throughout.

The stress relieving layer may comprise a non-melting layer. The choice for the non-melting layer may not be particularly limited so long as the non-melting layer has appropriate thickness and has high melting point and chemical compatibility with the braze at brazing temperature. The non-melting layer may comprise copper, silver, gold, for example. The thickness of the stress relieving layer may be about from 25 micrometers to 400 micrometers, including 50 micrometers, 100 micrometers, 150 micrometers, 200 micrometers, 250 micrometers, 300 micrometers, 350 micrometers. In one embodiment, the plurality of braze alloy layers in a pre-brazed assembly comprise following layers in sequence: a Ag—Cu alloy as a first layer, such as 72Ag-28Cu, a Ti layer as a second layer, a Ag—Cu alloy as a third layer, such as 72Ag-28Cu, a Cu layer as a fourth layer, and a Ag—Cu layer, such as 72Ag-28Cu, as a last layer before brazing. In another embodiment, the plurality of braze alloy layers in a pre-brazed assembly may comprise following layers in sequence: a 72Ag-28Cu alloy as a first layer, a Ti layer as a second layer, a 72Ag-28Cu alloy as a third layer, a Cu layer as a fourth layer, a 72Ag-28Cu layer as a fifth layer, a Ti layer as a sixth layer, and a 72Ag-28Cu as a last layer before brazing. In yet another embodiment, it is also possible to make the pre-brazed assembly with Ti alloyed with the Ag—Cu, rather than being present as a distinct layer. In further another embodiment, it would also be possible to produce similar joints using braze alloy paste rather than solid foils. In such embodiments, the stress relieving layer may continue to be a solid foil.

The substrate may have two primary functions, for example. First, the substrate may provide structural support for the diamond layer, so that a relatively thin diamond layer may be utilized to provide abrasion resistance in a tool. Without the use of a supporting substrate, the diamond layer would not have sufficient strength to withstand the stresses applied during the tool application. Second, the substrate may provide a means of attaching the diamond layer to the tool holder. Without the relatively thick and strong substrate, attachment of the diamond to the tool holder may be much more difficult to accomplish.

In an embodiment, a method 200 for producing a brazed superabrasive joint may comprise: positioning a plurality of braze alloy layers between a first diamond containing material and a substrate, wherein at least a portion of a surface of the first diamond-containing material is in direct contact with a first layer of the plurality of braze alloy layers, at least a portion of a surface of the substrate is in direct contact with a last layer of the plurality of braze alloy layers, wherein the first layer and the last layer are at opposite side of the plurality of the braze alloy layers in a step 202; applying a heat source to heat at least one of the plurality of braze alloy layers, the first diamond containing material and the substrate at a predetermined temperature until the first layer and the last layer of the plurality of the braze alloy layers begin to melt in a step 204; and forming a refractory metal carbide between the first diamond-containing material and a second layer of the plurality of braze alloy layers in a step 206.

In an embodiment of the process, the braze metal alloy may comprise silver, copper, manganese, nickel, zinc, palladium, chromium, boron, titanium, silicon, cadmium, gold, aluminum, indium or an alloy or composite thereof, for example. In an embodiment of the process, the substrate may comprise a second diamond-containing material, a cemented carbide, a polycrystalline cubic boron nitride (PcBN) superabrasive, a ceramic, a metal, a metal alloy, and/or combinations thereof, for example.

In an embodiment, the plurality of metal alloy layers may comprise a stress relieving layer between the first layer and the last layer. The stress relieving layer may comprise a copper layer. In another embodiment, the stress relieving layer may comprise a nickel layer.

Mining tools have been produced with cylindrical and conical brazing surfaces. Brazing to conical surfaces has been completed successfully using a 0.010" (250 µm) thick Ticusil® preformed cup, for example. Ticusil® is composed on three layers of metal: two outer layers of 72Ag-28Cu on either side of a pure Ti layer. The Ti layer may be about 10% the thickness of the entire foil (4.5% by weight), for example. During brazing, the Ag—Cu eutectic melts at 780° C. and the Ti may dissolve into the Ag—Cu and react with the diamond to form a strong bond. This type of braze joint has no non-melting filler. While the braze strengths have been sufficient in cutting tests, analysis of cross sections have showed that the braze joint varied due to tilting of the diamond tip in the pocket. The following multi-layered braze construction is proposed to solve the joint thickness variation problem.

In one embodiment, a five component braze foil in a pre-braze assembly may be used with the following layers in sequence: (1) 10 µm thick 72Ag-28Cu, (2) 2.5 µm thick Ti, (3) 10 µm thick 72Ag-28Cu, (4) 200 µm thick Cu, and (5) 20 µm thick 72Ag-28Cu. When heated to a brazing temperature of about 900° C. to 920° C., both outer Ag—Cu alloys may melt starting at 780° C. In Layer 1, placed adjacent to the Versimax® part, the Ti may dissolve in the Ag—Cu alloy and form a strong bond to the Versimax®. Layer 5 may melt and form a strong bond to the substrate (including a cemented tungsten carbide substrate). Active braze may not needed in this location, although it would not be harmful to include Ti in this layer as well. Layer 4, pure Cu, may alloy to a certain extent with the adjacent layers, but would still maintain a primarily unmelted Cu core that would provide the desired centering and stress relief. There are many other possible arrangements, but the key requirement may be an thick core (Cu) with an active metal braze configuration on at least one side to provide attachment to a diamond composite tip, where the thick core (Cu) remains unmelted during the brazing process.

While the most convenient manufacturing method would be a preformed cup from a single multi-layered foil, the embodiment would work equally well if it was constructed, in another embodiment, using three nesting cups consisting of Ticusil®/Cu/72Ag-28Cu (also known as BAg-8) or 3 nesting cups consisting of Ticusil®/Cu/Ticusil®.

In another embodiment, the braze alloy may include palladium, nickel, and chromium, which is commercially sold as Palnicro-30 by Wesgo Metals. As an example, one arrangement of the braze layer may include a PdNiCr braze alloy as the first braze layer, a Ni layer as a second layer, and a PdNiCr braze alloy as the last braze layer. In this embodiment, the chromium acts as a carbide former with the diamond, thereby forming chromium carbide with in regions between the diamond and the nickel stress relieving layer.

In an embodiment, the heating substep is not particularly limited so long as at least one of the braze metal, the refractory metal layer, and the substrate are heated to a temperature above a liquidus temperature, or a melting point sufficient to melt the braze metal. In an embodiment, the brazing step may comprise applying a heat source to heat at least the braze metal to a temperature of from about 700° C. to about 1000° C., for example. Further, the heat source is not particularly limited so long as it is capable of heating at least the braze metal to a temperature of from about 700° C. to about 1000° C., for example. As an example, the heat source may be at least one of a furnace, a microwave device, a laser, or an induction coil.

The use of induction coils for brazing non-diamond materials, for example, for brazing tungsten carbide cutting tools to steel tool bodies, is widespread. Brazing with an induction coil is simple, fast, effective, and requires very low capital startup cost. Optimal temperature ranges are dependent upon the braze metal selected. In general, the optimal temperature is just above the braze metal's liquidus temperature. During the brazing process, the brazing operator may watch the materials being brazed for evidence of melting. The brazing operator may turn off the power from the induction coil at the onset of braze flow.

In an embodiment, the method of brazing a diamond-containing material may include the ability to perform brazing at ambient atmospheric pressures and/or in the presence of air. This ability allows brazing to be conducted with brazing equipment, such as induction coils, that is widely available at low cost. Furthermore, the skill, expertise, and knowledge needed to induction braze in air is widespread. These factors should allow for the widespread adoption of diamond materials in tools and applications without requiring significant new investments by those currently engaged in production of brazed tools.

Uncoated diamond-containing materials may not be successfully brazed in ambient air pressure and in air. Without being bound by theory, it is believed that air brazing of diamond fails because the oxygen present in the air reacts with the diamond and active metal elements contained in the braze metals. The oxygen and active metal elements react to form various oxide compounds, which interfere with the bond between the braze metal and the diamond. Removal of oxygen is known to result in successful brazing of diamond using braze alloys that are not otherwise successful at air brazing. Oxygen may be removed by use of either an inert cover gas such as argon, or by removing all gaseous elements using a high vacuum chamber, or by providing a reducing atmosphere by supplying $H_2$ gas. By first coating the diamond-containing material with a refractory metal or refractory metal carbide that forms a strong bond to the diamond, the need to use reactive metal elements in the braze is removed. Braze metals that are known to form strong bonds between the chosen refractory metal and the substrate, and which are compatible with air brazing, may then be utilized to join the coated diamond-containing material to the substrate. Further, the brazing still may be performed under ambient air pressure and adding air.

Example 1

A Versimax silicon carbide diamond composite disc and a WC disc were obtained, both measuring 13.7 mm diameter and 5.25 mm thickness. Ticusil foils measuring 13.7 mm diameter and 50 µm thick and a Cu foil measuring 13.7 mm diameter and 500 µm thick were also obtained. A pre-braze assembly was produced with the stacking sequence of WC/Ticusil/Cu/Ticusil/Versimax. The pre-braze assembly was placed into a vacuum furnace, covered with a graphite plate, compressed using a WC weight, and brazed. After the sample was brazed, a section was cut by wire EDM and the braze joint was polished using a Hitachi E-3500 ion mill polisher in order to examine the structure of the braze joint.

Figure 4:
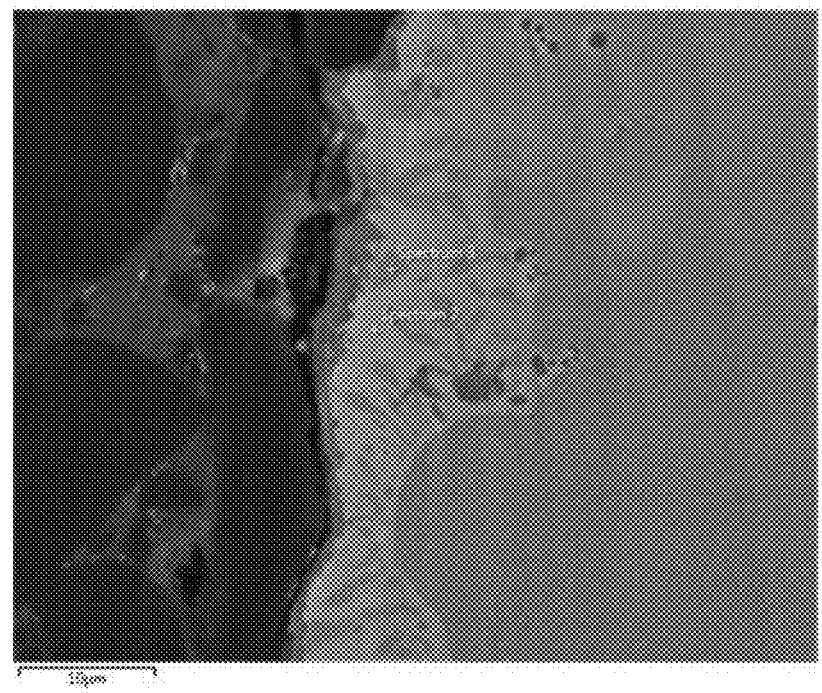
FIG. 4 is a magnified cross-sectional view of a brazed superabrasive joint containing a diamond-containing material, a Ticusil® layer, and a stress-relieving layer according an embodiment.
Figure 5:
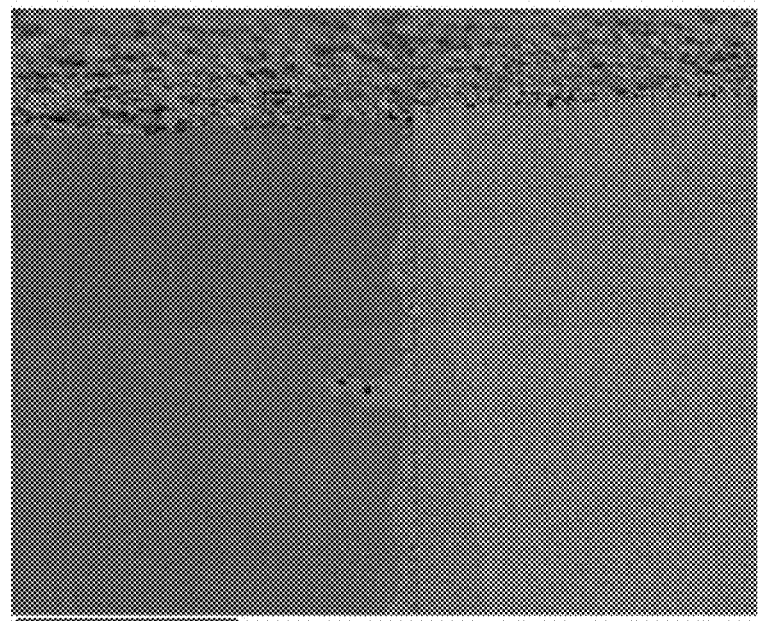
FIG. 5 is a prospective view of a brazed superabrasive joint containing a copper layer, Ticusil®, and cemented WC layer according to an embodiment.

The structure of the braze joint was illustrated in the following images. FIG. 3 shows an SEM image of the first diamond containing material, such as Versimax (left), Ticusil (middle), and stress-relieving layer, such as Cu layer (right). FIG. 4 shows a higher magnification SEM image showing the Versimax (left), TiC (middle-left), Ticusil (middle-right), and Cu (right) layers. FIG. 5 shows an SEM image of the Cu layer (left), Ticusil (middle), and WC (right).

Example 2

The effect of adding non-melting Cu layers to form braze joints of varying thickness was measured. Four sets of braze samples were prepared. Each set of pre-braze assemblies consisted of one 12.4 mm Versimax disc brazed to one 14.1 mm WC disc. Three samples were brazed in each set. The braze metal layers used are given in the table below.

| Sample Set | 1 | 2 | 3 | 4 |
|---|---|---|---|---|
| First Layer | 50 μm Ticusil | 50 μm Ticusil | 50 μm Ticusil | 50 μm Ticusil |
| Second Layer | None | 50 μm Cu | 100 μm Cu | 175 μm Cu |
| Third Layer | None | 50 μm Ticusil | 50 μm Ticusil | 50 μm Ticusil |

Figure 6:
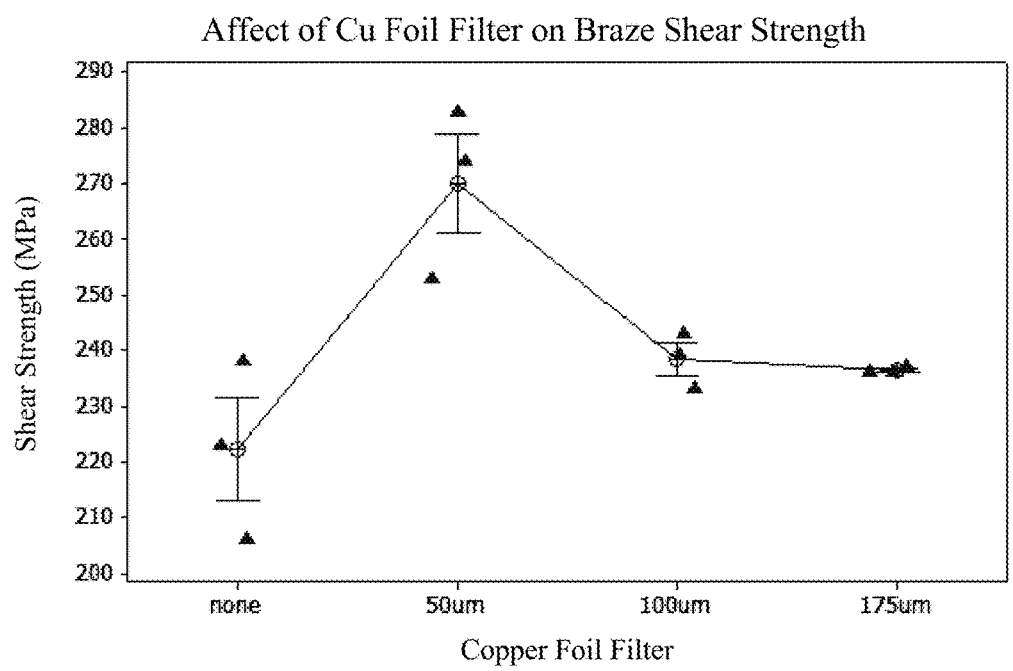
FIG. 6 is a graph illustrating braze shear strength of brazed joints having a variety of thicknesses of copper foil filler according to an embodiment.

Brazing was conducted in a cold wall vacuum furnace using flowing Ar gas at 1 atm. The results are shown in FIG. 6. The shear strengths of all of the braze joints containing Cu foil filler were greater than the strengths of the braze joints consisting of only Ticusil.

Example 3

A Versimax silicon carbide diamond composite disc and a WC disc were obtained, both measuring 13.7 mm diameter and 5.25 mm thickness. Palnicro-30 foils measuring 13.7 mm diameter and 50 μm thick and a Ni foil measuring 13.7 mm diameter and 250 μm thick were also obtained. A pre-braze assembly was produced with the stacking sequence of WC/Palnicro-30/Ni/Palnicro-30/Versimax. The pre-braze assembly was placed into a vacuum furnace, covered with a graphite plate, compressed using a WC weight, and brazed.

List of Itemized Embodiments

In a first embodiment, the disclosure provides a brazed superabrasive assembly, comprising: a superabrasive layer; a stress relieving layer coupled to the superabrasive layer by a first braze layer; and a substrate coupled to the stress relieving layer by a last braze layer, wherein the stress relieving layer has a solidus or melting temperature that is greater than a solidus temperature of the first braze layer and the last braze layer.

In a second embodiment, the disclosure provides the brazed superabrasive assembly of the first embodiment, wherein the stress relieving layer comprises copper or a copper alloy.

In a third embodiment, the disclosure provides the brazed superabrasive assembly of the first embodiment, wherein the stress relieving layer comprises nickel or a nickel alloy.

In a fourth embodiment, the disclosure provides the brazed superabrasive assembly of any of the first to third embodiments, wherein the first braze layer comprises a refractory metal or a refractory metal alloy that is positioned between the superabrasive layer and the stress relieving layer.

In a fifth embodiment, the disclosure provides the brazed superabrasive assembly of any of the first to fourth embodiments, further comprising a carbide layer, wherein the carbide layer is positioned between a first diamond-containing material and the first braze layer.

In a sixth embodiment, the disclosure provides the brazed superabrasive assembly of the fifth embodiment, wherein the carbide layer comprises a carbide of a refractory metal.

In a seventh embodiment, the disclosure provides the brazed superabrasive assembly of any of the fourth to sixth embodiments, wherein the refractory metal comprises at least one of tungsten, titanium, niobium, zirconium, tantalum, vanadium, chromium, molybdenum, or an alloy or composite thereof.

In an eighth embodiment, the disclosure provides the brazed superabrasive assembly of any of the first to seventh embodiments, wherein the first braze layer and the second braze layer each comprise at least one of silver, copper, manganese, nickel, zinc, palladium, chromium, boron, titanium, tin, silicon, cadmium, gold, aluminum, indium or an alloy or composite thereof.

In a ninth embodiment, the disclosure provides the brazed superabrasive assembly of any of the first to eighth embodiments, wherein the superabrasive layer comprises at least one of a single crystal diamond, a chemical vapor deposition diamond, a silicon carbide bonded diamond composite, a cobalt-polycrystalline diamond composite, a thermally-stable diamond composite, or combinations thereof.

In a tenth embodiment, the disclosure provides the brazed superabrasive assembly of any of the first to ninth embodiments, wherein the substrate comprises a second diamond-containing material, a cemented carbide, a polycrystalline cubic boron nitride (PcBN) superabrasive, a ceramic, a metal, a metal alloy, or combinations thereof.

In an eleventh embodiment, the disclosure provides the brazed superabrasive assembly of any of the first to tenth embodiments, wherein, prior to brazing, the brazed superabrasive assembly comprises a pre-brazed assembly having the following layers in sequence: an Ag—Cu braze alloy as the first braze layer; a Ti layer as a second layer; a Ag—Cu braze alloy as a third layer; a Cu layer as a fourth layer; and a Ag—Cu braze alloy as the last braze layer.

In a twelfth embodiment, the disclosure provides the brazed superabrasive assembly of any of the first to tenth embodiments, wherein, prior to brazing, the brazed superabrasive assembly comprises a pre-brazed assembly having the following layers in sequence: a Ag—Cu braze alloy as the first braze layer; a Ti layer as a second layer; a Ag—Cu braze alloy as a third layer; a Cu layer as a fourth layer; a Ag—Cu braze alloy as a fifth layer; a Ti layer as a sixth layer; and a Ag—Cu braze alloy as the last braze layer.

In a thirteenth embodiment, the disclosure provides the brazed superabrasive assembly of any of the first to tenth embodiments, wherein, prior to brazing, the brazed superabrasive assembly comprises a pre-brazed assembly having the following layers in sequence: a PdNiCr braze alloy as the first braze layer; a Ni layer as a second layer; and a PdNiCr braze alloy as the last braze layer.

In a fourteenth embodiment, the disclosure provides the brazed superabrasive assembly of any of the first to thirteenth embodiments, wherein the plurality of braze alloy layers have a thickness of about 25 μm to about 300 μm before melting.

In a fifteenth embodiment, the disclosure provides a method of fabricating a brazed superabrasive assembly, comprising: positioning a plurality of braze alloy layers between a first diamond containing material and a substrate, wherein: at least a portion of a surface of the first diamond-containing material is in direct contact with a first layer of braze alloy, at least a portion of a surface of the substrate is in direct contact with a last layer of braze alloy, and the first layer and the last layer are positioned along opposite sides of a stress relieving layer; applying a heat source to heat the plurality of layers of braze alloy, the first diamond containing material, and the substrate to a predetermined temperature until the first layer and the last layer of braze alloy reach at least their liquidus temperatures; and forming a refractory metal carbide between the first diamond-containing material and the stress relieving layer.

In a sixteenth embodiment, the disclosure provides the brazed superabrasive assembly of any of the fifteenth embodiment, wherein the stress relieving layer has a solidus or melting temperature that is greater than a solidus temperature of the first layer of braze alloy and the last layer of braze alloy.

In a seventeenth embodiment, the disclosure provides the brazed superabrasive assembly of any of the fifteenth to sixteenth embodiments, wherein the stress relieving layer comprises copper or a copper alloy.

In an eighteenth embodiment, the disclosure provides the brazed superabrasive assembly of any of the fifteenth to sixteenth embodiments, wherein the stress relieving layer comprises nickel or a nickel alloy.

In a nineteenth embodiment, the disclosure provides the brazed superabrasive assembly of any of the fifteenth to seventeenth embodiments, wherein each of the plurality of braze metal alloy layers comprises at least one of silver, copper, manganese, nickel, zinc, palladium, chromium, boron, titanium, tin, silicon, cadmium, gold, aluminum, indium or an alloy or composite thereof.

In a twentieth embodiment, the disclosure provides the brazed superabrasive assembly of any of the fifteenth to nineteenth embodiments, wherein the first layer comprises a refractory metal, wherein the refractory metal comprises at least one of tungsten, titanium, niobium, zirconium, tantalum, vanadium, chromium, or molybdenum.

In a twenty-first embodiment, the disclosure provides the brazed superabrasive assembly of any of the fifteenth to twentieth embodiments, wherein the braze alloy is a paste.

In a twenty-first embodiment, the disclosure provides the brazed superabrasive assembly of any of the fifteenth to twentieth embodiments, wherein the braze alloy is a foil.

In a twenty-second embodiment, the disclosure provides the brazed superabrasive assembly of any of the fifteenth to twenty-first embodiments, wherein the first layer of braze alloy comprises a eutectic composition of the braze alloy constituents.

In a twenty-second embodiment, the disclosure provides the brazed superabrasive assembly of any of the fifteenth to twenty-second embodiments, wherein the first layer of braze alloy comprises a lamellar composition of the braze alloy constituents.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A pre-brazed assembly comprising:
   a superabrasive layer;
   a braze foil; and
   a substrate,
   wherein the braze foil has the following layers in sequence:
   an Ag—Cu braze alloy as the first braze layer;
   a Ti layer as a second layer;
   a Ag—Cu braze alloy as a third layer;
   a Cu layer as a fourth layer; and
   a Ag—Cu braze alloy as the last braze layer, and
   wherein the first braze layer is oriented toward the superabrasive layer and the last braze layer is oriented toward the substrate.

2. The pre-brazed assembly of claim 1, wherein the superabrasive layer comprises at least one of a single crystal diamond, a chemical vapor deposition diamond, a silicon carbide bonded diamond composite, a cobalt-polycrystalline diamond composite, a thermally-stable diamond composite, or combinations thereof.

3. The pre-brazed assembly of claim 1, wherein the substrate comprises a diamond containing material, a cemented carbide, a polycrystalline cubic boron nitride (PcBN) superabrasive, a ceramic, a metal, a metal alloy, or combinations thereof.

4. The a pre-brazed assembly of claim 1, wherein the layers of the braze foil further have, between the fourth layer and the last braze layer, the following layers in sequence:
   a Ag—Cu braze alloy as a fifth layer; and
   a Ti layer as a sixth layer.

5. The pre-brazed assembly of claim 1, wherein the superabrasive layer comprises a diamond material, wherein the diamond material is coated with a refractory metal or metal alloy, and wherein the refractory metal or metal alloy reacts with diamond material.

6. The pre-brazed assembly of claim 1, wherein the superabrasive layer comprises a diamond material, and wherein the diamond material is coated with titanium.

7. The pre-brazed assembly of claim 1, wherein the Ag—Cu braze alloy as the last braze layer include titanium.

8. The pre-brazed assembly of claim 4, wherein the Ag—Cu braze alloy as the last braze layer include titanium.

9. A method of fabricating a brazed assembly comprising brazing the pre-brazed assembly of claim 1.

* * * * *